United States Patent
Xu et al.

(10) Patent No.: US 8,234,292 B2
(45) Date of Patent: Jul. 31, 2012

(54) SYSTEM, METHOD, AND COMPUTER-READABLE MEDIUM FOR OPTIMIZING PROCESSING OF QUERIES FEATURING MAXIMUM OR MINIMUM EQUALITY CONDITIONS IN A PARALLEL PROCESSING SYSTEM

(75) Inventors: Yu Xu, San Diego, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 795 days.

(21) Appl. No.: 12/332,602

(22) Filed: Dec. 11, 2008

(65) Prior Publication Data

US 2010/0153429 A1 Jun. 17, 2010

(51) Int. Cl.
*G06F 17/30* (2006.01)
(52) U.S. Cl. ...................................................... 707/764
(58) Field of Classification Search .................. 707/637, 707/713, 764, E17.017
See application file for complete search history.

(56) References Cited

U.S. PATENT DOCUMENTS

| | | | | |
|---|---|---|---|---|
| 6,952,692 | B1 * | 10/2005 | Bhattiprolu et al. | 707/704 |
| 7,319,997 | B1 * | 1/2008 | Morris et al. | 707/714 |
| 2007/0083490 | A1 * | 4/2007 | Au et al. | 707/2 |

* cited by examiner

*Primary Examiner* — Fred I Ehichioya
(74) *Attorney, Agent, or Firm* — Steve McDonald

(57) ABSTRACT

A system, method, and computer-readable medium for optimized processing of queries that feature maximum or minimum equality conditions are provided. A table on which the query is applied is scanned a single time. Rows of the table distributed to respective processing modules are scanned by the processing modules. Each processing module maintains identification of any rows distributed to the respective processing module that have attribute values that equal the maximum or minimum attribute value locally identified by the processing module. Subsequently, a global aggregation mechanism is invoked to compute the query result without requiring an additional rescan of the table. Further, the disclosed mechanisms may be extended to compute top N queries featuring maximum or minimum equality conditions.

22 Claims, 7 Drawing Sheets

Employee 500 → 520

| | 520a | 520b | 520c |
|---|---|---|---|
| | Employee_No | SS_Num | Salary |
| 510a | 56789 | 111-11-1111 | 55000 |
| 510b | 12345 | 222-22-2222 | 65000 |
| 510c | 23232 | 333-33-3333 | 65000 |
| 510d | 34343 | 444-44-4444 | 70000 |
| 510e | 45454 | 555-55-5555 | 90000 |
| 510f | 56565 | 666-66-6666 | 85000 |
| 510g | 67676 | 777-77-7777 | 105000 |
| 510h | 78787 | 888-88-8888 | 60000 |
| 510i | 89898 | 999-99-9999 | 35000 |

Figure 5

SYSTEM, METHOD, AND COMPUTER-READABLE MEDIUM FOR OPTIMIZING PROCESSING OF QUERIES FEATURING MAXIMUM OR MINIMUM EQUALITY CONDITIONS IN A PARALLEL PROCESSING SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In contemporary parallel processing systems in which rows of tables are distributed across multiple processing modules, queries featuring maximum or minimum equality conditions require a table to be read twice to process the query when there is no index on the attribute on which the maximum or minimum equality condition is applied. The system first scans the table to compute the maximum or minimum attribute value, and then the maximum or minimum attribute value is broadcast to every processing module. The system then scans the table again to find records qualified by the identified maximum or minimum attribute value. In systems that feature large tables, the requisite resources consumed for processing such a query often become disadvantageously extensive.

SUMMARY

Disclosed embodiments provide a system, method, and computer readable medium that facilitate optimized processing of queries that feature maximum or minimum equality conditions. A table on which the query is applied is scanned a single time. Rows of the table distributed to respective processing modules are scanned by the processing modules. Each processing module maintains identification of any rows distributed to the respective processing module that have attribute values that equal the maximum or minimum attribute value locally identified by the processing module. Subsequently, a global aggregation mechanism is invoked to compute the query result without requiring an additional rescan of the table. Further, the disclosed mechanisms may be extended to compute top N queries featuring maximum or minimum equality conditions.

BRIEF DESCRIPTION OF THE DRAWINGS

Aspects of the present disclosure are best understood from the following detailed description when read with the accompanying figures, in which:

FIG. 5 is a diagrammatic representation of a portion of an exemplary table on which mechanisms for optimizing processing of queries that feature maximum or minimum equality conditions may be implemented in accordance with disclosed embodiments;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, mechanisms for processing queries that feature maximum or minimum equality conditions are provided in which a table on which the query is applied is scanned a single time. Rows of the table distributed to respective processing modules are scanned by the processing modules. Each processing module maintains identification of any rows distributed to the respective processing module that have attribute values that equal the maximum or minimum attribute value locally identified by the processing module. Subsequently, a global aggregation mechanism is invoked to compute the query result without requiring an additional rescan of the table. Further, the disclosed mechanisms may be extended to compute top N queries featuring maximum or minimum equality conditions.

Figure 1:
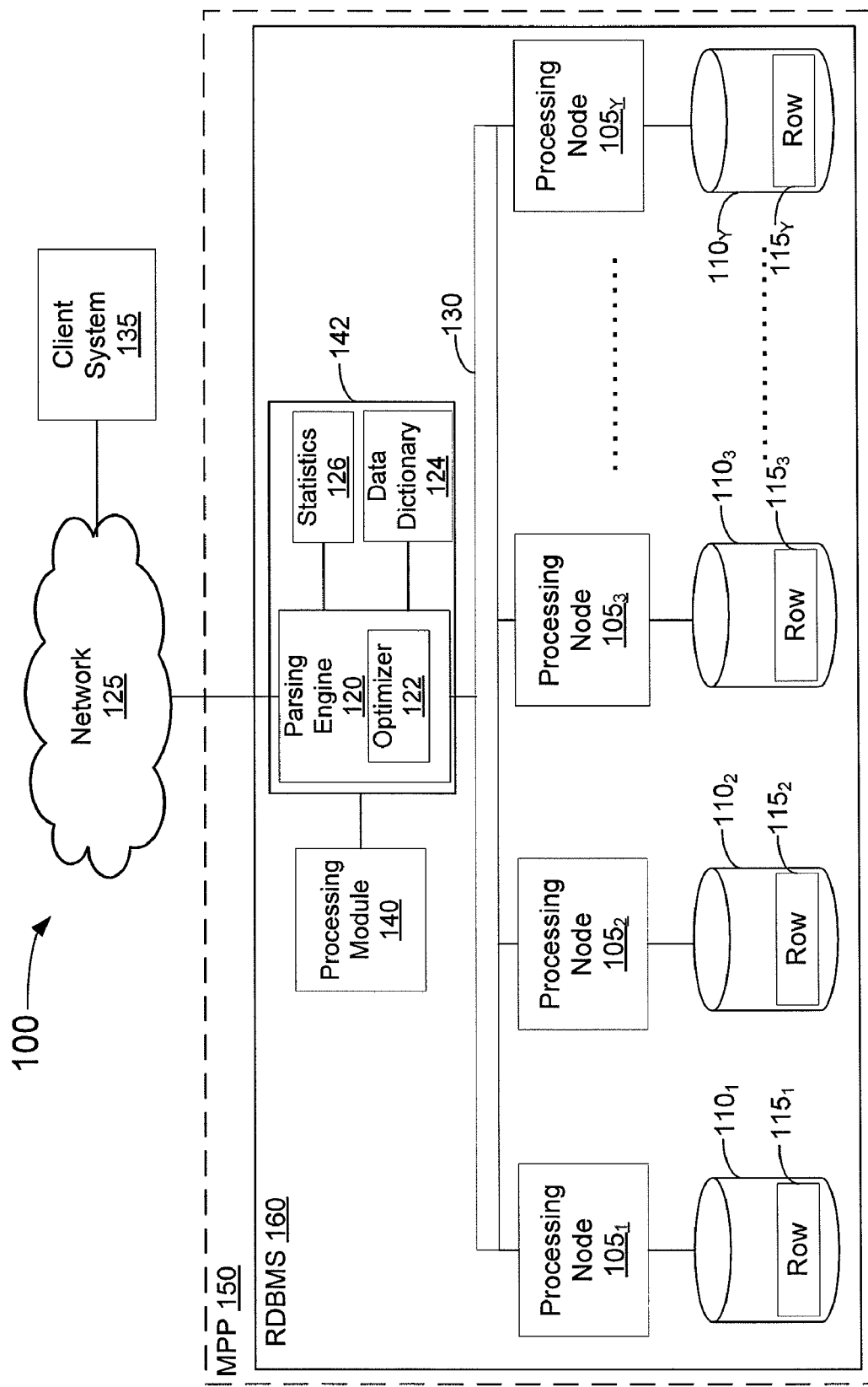
FIG. 1 depicts a diagrammatic representation of an exemplary architecture for a large database system that is suited for implementing mechanisms for optimizing processing of queries that feature maximum or minimum equality conditions in accordance with disclosed embodiments.

FIG. 1 depicts a diagrammatic representation of an exemplary architecture for a large database system 100, such as a Teradata Active Data Warehousing System, that is suited for implementing mechanisms for optimizing processing of queries that feature maximum or minimum equality conditions in accordance with disclosed embodiments. The database system 100 includes a relational database management system (RDBMS) 160 built upon a massively parallel processing (MPP) system 150.

As shown, the database system 100 includes one or more processing nodes $105_1 \ldots _Y$ that manage the storage and retrieval of data in data-storage facilities $110_1 \ldots _Y$. Each of the processing nodes may host one or more physical or virtual processing modules, such as one or more access module processors (AMPs). Each of the processing nodes $105_1 \ldots _Y$ manages a portion of a database that is stored in a corresponding one of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Y$ of the tables are stored across multiple data-storage facilities $110_1 \ldots _Y$ to ensure that the system workload is distributed evenly across the processing nodes $105_1 \ldots _Y$. A parsing engine 120 organizes the storage of data and the distribution of table rows $115_1 \ldots _Y$ among the processing nodes $105_1 \ldots _Y$ and accesses processing nodes $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_1 \ldots _Y$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The optimizer may utilize statistics 126 for making query assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI). The parsing engine 120, the data dictionary 124, and the statistics 126 may be implemented as computer-executable instruction sets tangibly embodied on a computer-readable medium, such as a memory device 142, that are retrieved by a processing module 140 and processed thereby.

Figure 2:
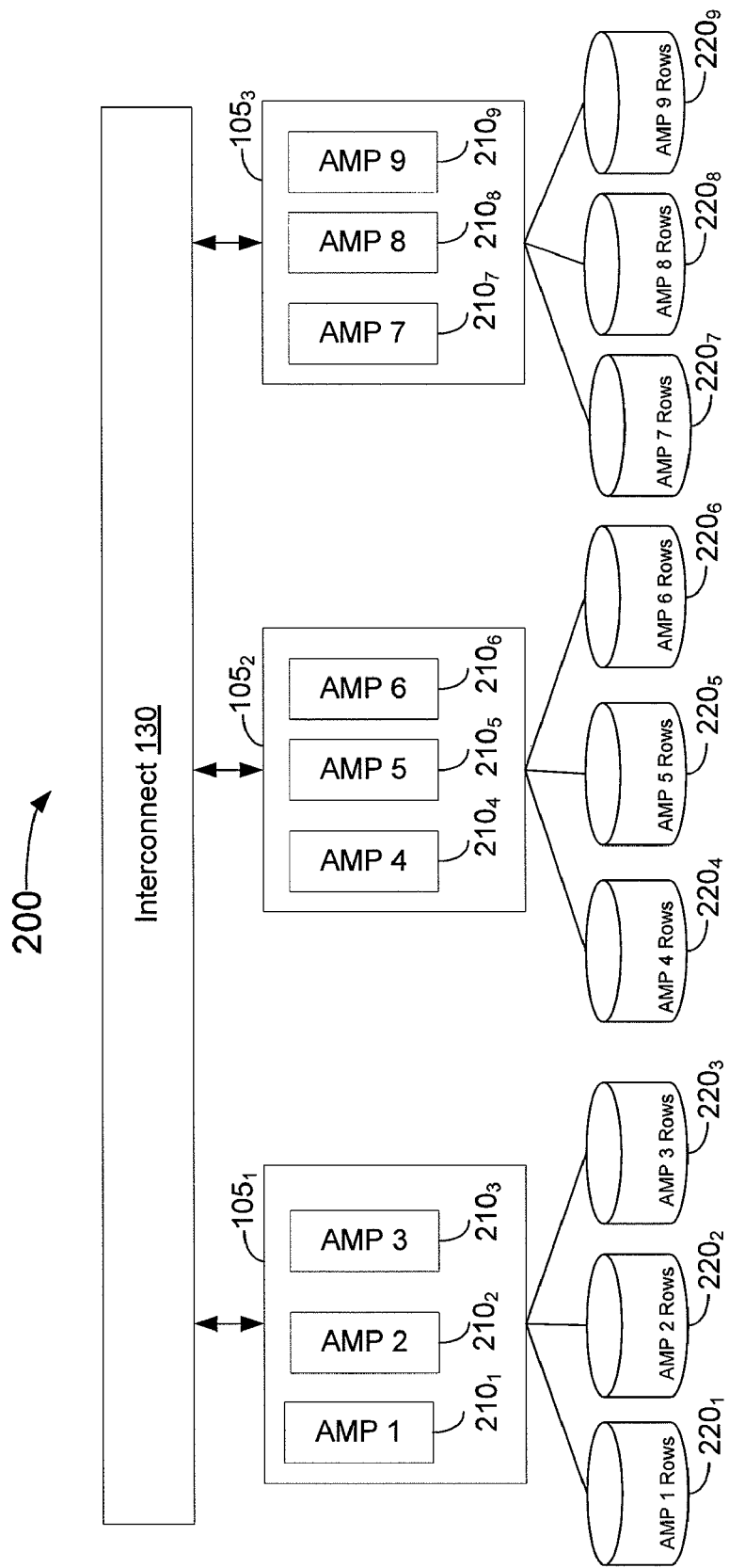
FIG. 2 is a diagrammatic representation of a massively parallel processing configuration suitable for implementing mechanisms for optimizing processing of queries that feature maximum or minimum equality conditions in accordance with disclosed embodiments.

FIG. 2 is a diagrammatic representation of an MPP configuration 200 suitable for implementing mechanisms for optimizing processing of queries that feature maximum or minimum equality conditions in accordance with disclosed embodiments. In the illustrative example, each of the processing nodes $105_1$-$105_3$ are each configured with three respective AMPs $210_1$-$210_9$. The rows $115_1 \ldots _Y$ depicted in FIG. 1 of tables have been distributed across the nine AMPs $210_1$-$210_9$ hosted by processing nodes $105_1$-$105_3$ such that each of the AMPs is allocated rows $220_1$-$220_9$. For example, the rows $115_1 \ldots _Y$ may be distributed or partitioned across the data-storage facilities $110_1 \ldots _Y$ by the parsing engine 120 in accordance with their primary index. The primary index defines the columns of the rows that are used for calculating a hash value. A hash function produces hash values from the values in the columns specified by the primary index. Some portion, possibly the entirety, of the hash value is designated a "hash bucket". The hash buckets are assigned to data-storage facilities $110_1 \ldots _Y$ and associated processing modules, such as AMPs $210_1 \ldots _9$, by a hash bucket map. The characteristics of the columns chosen for the primary index determine how evenly the rows are distributed.

Figure 3:
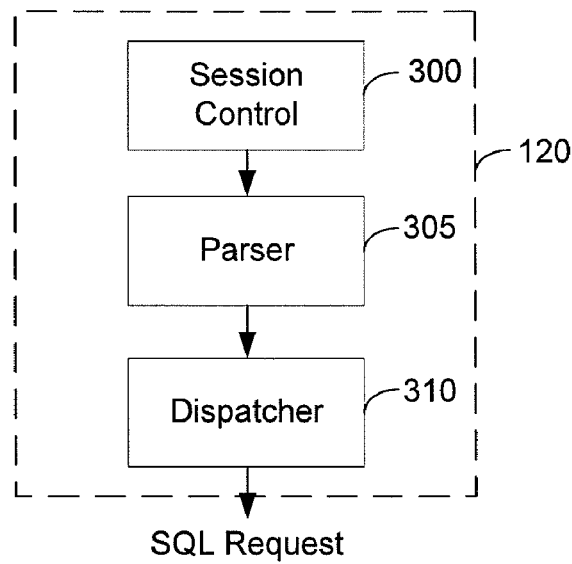
FIG. 3 is a diagrammatic representation of a parsing engine implemented in accordance with an embodiment.
Figure 4:
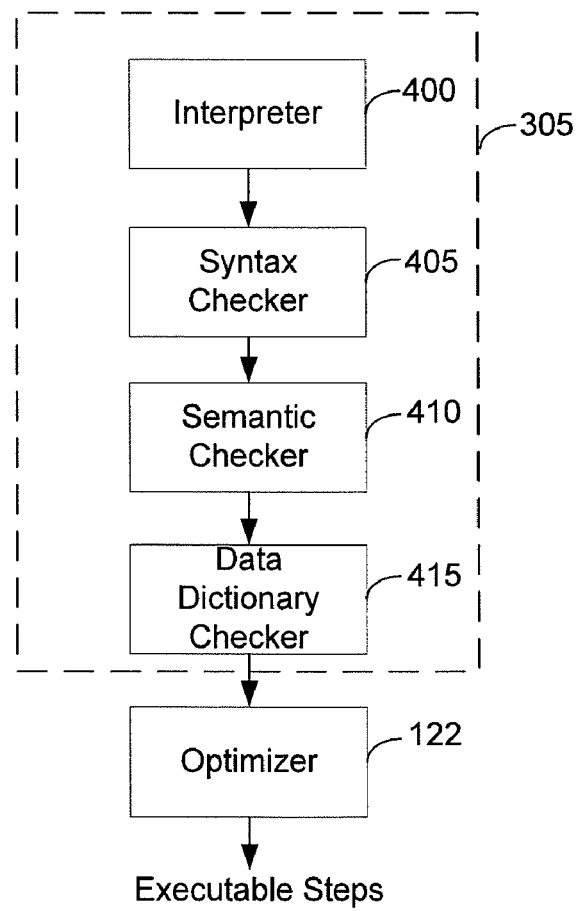
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 depicted in FIG. 1 to ensure that all of the objects specified in the SQL request exist and that the user has the authority to perform the request (block 415). Finally, the parser 305 runs the optimizer 122 that selects the least expensive plan to perform the request.

FIG. 5 is a diagrammatic representation of a portion of an exemplary table 500 on which mechanisms for optimizing processing of queries that feature maximum or minimum equality conditions may be implemented in accordance with disclosed embodiments. Table 500 comprises a plurality of records $510a$-$510i$ (collectively referred to as records 510) and fields $520a$-$520c$ (collectively referred to as fields 520). Each record 510 comprises data elements in respective fields, or attributes, 520. In the present example, table 500 has a table name "Employee" and includes fields 520 having respective labels of "Employee_No", "SS_Num", and "Salary".

Consider an exemplary query for identifying the highest paid employee(s) specified in the table Employee:

SELECT*From Employee
WHERE salary=(select max(salary) From Employee)

In the examples provided herein, it is assumed that the database system does not have an index allocated for the attribute on which the maximum or minimum equality condition is applied. Further assume that the records 510 of the table 500 are distributed across a plurality of processing modules, e.g., each record may be respectively distributed to one of the AMPs $210_1$-$210_9$ depicted in FIG. 2. For example, the RDBMS 160 depicted in FIG. 1 may be configured with a "hash value"-to-"processing module" mapping table. The RDBMS may apply a hash function to a particular one or more table attributes of the table records, and the hash value (or a portion thereof) is taken to map the hash value to an integer referred to as a hash bucket. The hash bucket is mapped to a particular processing module, e.g., AMP. The row is then distributed to the AMP to which the hash bucket is mapped.

In accordance with disclosed embodiments, each AMP involved in processing the query initializes a local maximum or minimum variable (designated LMV) for monitoring the local maximum or minimum value of the attribute on which the maximum or minimum equality condition is applied. If the predicate applies a maximum equality condition to the attribute, each AMP initializes the LMV to the minimum value that may be stored by the attribute. If the predicate applies a minimum equality condition to the attribute, each AMP initializes the LMV to the maximum value that may be stored by the attribute. Additionally, each AMP initializes a result spool to store rows having an attribute value that equals the LMV. When a row is identified that has an attribute value that exceeds the LMV (when the equality condition is a maximum equality condition), the AMP deletes each row in the result spool, stores the currently evaluated row in the result spool, and resets the LMV to equal the attribute value of the currently evaluated row. In this manner, the LMV records the maximum local attribute value encountered by the AMP. Likewise, when a row is identified that has an attribute value that is less than the LMV (in the case the equality condition is a minimum equality condition), the AMP deletes each row from the result spool, stores the currently evaluated row in the result spool, and resets the LMV to the attribute value of the row. In this manner, the LMV records the minimum local attribute value encountered by the AMP. If a row is identified that has an attribute value that equals the LMV, the row is added to the result spool. When a row is identified that has an attribute value that is less than the LMV (in the case the equality condition is a maximum equality condition) or identifies a row that has an attribute value that is greater than the LMV (in the case the equality condition is a minimum equality condition), the AMP discards the row. When all rows have been scanned by the AMP, the AMP reports the local maximum or minimum attribute value recorded by the LMV to a central node which determines the global maximum or global minimum attribute value, depending on the equality condition. The central node then broadcasts the global maximum or minimum attribute value to each of the AMPs. Each AMP then compares the received global maximum or minimum attribute value with the LMV that specifies the local maximum or minimum attribute value. If the equality condition comprises a maximum equality condition and the global maximum value exceeds the local maximum attribute value specified by the LMV, the AMP discards the rows in the result spool. If the global maximum attribute value equals the local maximum attribute value specified by the LMV, the AMP maintains the row(s) in the result spool as part of the final query result. Likewise, if the equality condition comprises a minimum equality condition and the global minimum attribute value is less than the local minimum attribute value specified by the LMV, the AMP discards the rows in the result spool. If the global minimum attribute value equals the local minimum attribute value specified by the LMV, the AMP maintains the row(s) in the result spool as part of the final query result.

Figure 6:
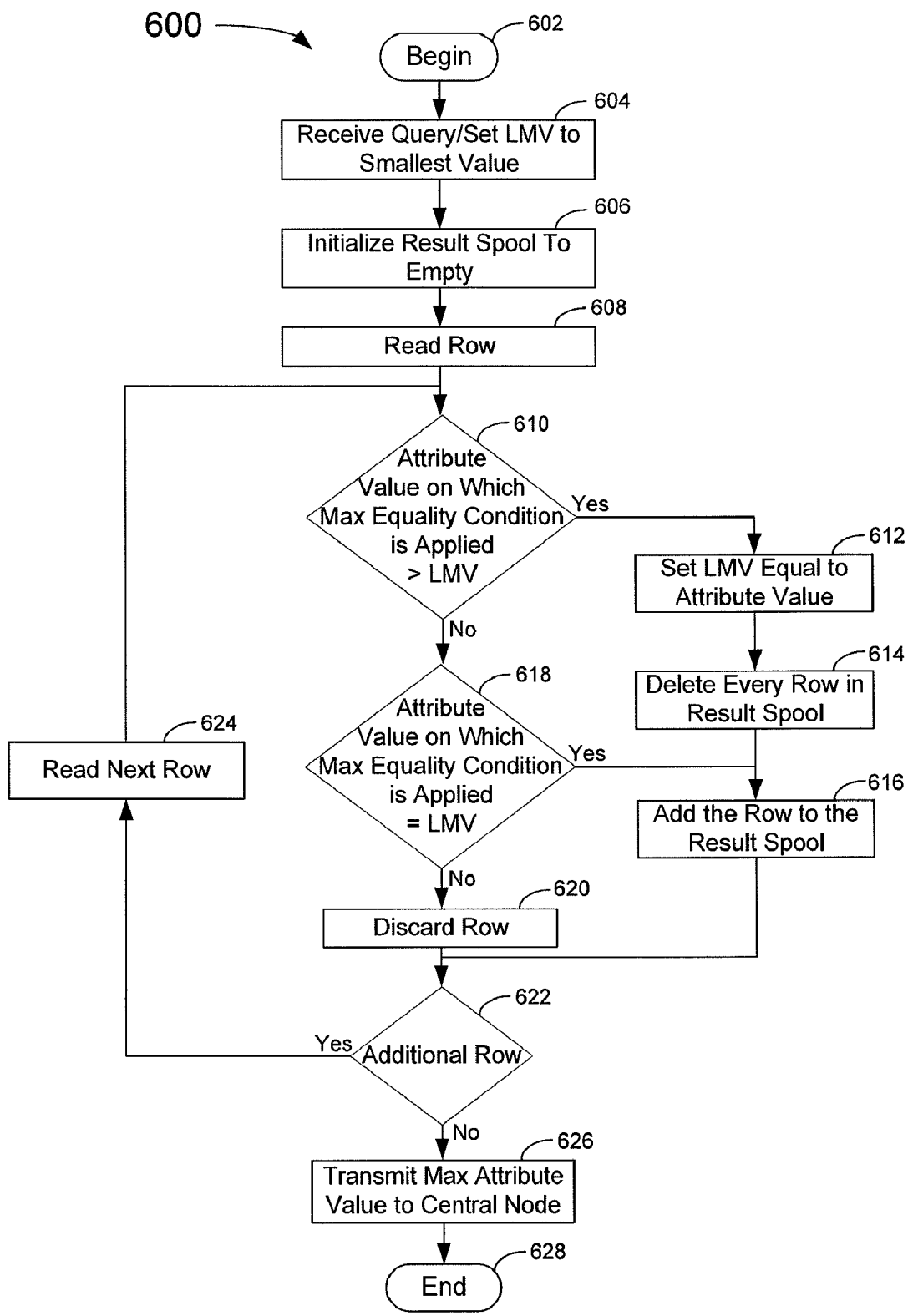
FIG. 6 is a flowchart that depicts processing of a local aggregation routine that facilitates processing optimization of queries that include a maximum or minimum equality condition implemented in accordance with an embodiment.

FIG. 6 is a flowchart 600 that depicts processing of a local aggregation routine that facilitates processing optimization of queries that include a maximum or minimum equality condition implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 2. To facilitate an understanding of disclosed embodiments, assume the query includes a maximum equality condition in the description of the aggregation routines of FIGS. 6-8.

The local aggregation routine is invoked (step 602). A query with a maximum equality condition applied to an attribute is received, and an LMV variable is set to the lowest value that may be stored by the attribute on which the maximum equality condition of the query is applied (step 604), e.g., lower than any value of the attribute of any row of the table on which the query is applied. The AMP then initializes a result spool (step 606), and reads a row distributed to the AMP of the table on which the query is applied (step 608). The AMP then evaluates the attribute value on which the maximum equality condition is applied to determine whether it is greater than the LMV (step 610). If the attribute value is greater than the LMV, the AMP sets the LMV to the attribute value of the currently evaluated row (step 612), deletes any rows currently stored in the result spool (step 614), and adds the currently evaluated row to the result spool (step 616). In this manner, the LMV is set to the local maximum attribute value identified by the AMP, and the result spool stores corresponding row(s) having an attribute value equaling the local maximum attribute value. The AMP may then determine whether an additional row remains for evaluation (step 622).

Returning again to step 610, if the attribute value of the currently evaluated row is not greater than the LMV, the AMP may then determine if the attribute value is equal to the LMV (step 618). If the attribute value is equal to the LMV, the currently evaluated row is added to the AMP's result spool according to step 616. If it is determined at step 618 that the attribute value is not equal to the LMV thereby indicating the attribute value is less than the LMV, the AMP may then discard the currently evaluated row (step 620) and determine if any additional row remains for evaluation according to step 622. If an additional row remains, the next row is read (step 624), and processing may return to step 610 to determine if the attribute value of the currently evaluated row is greater than the LMV.

When no additional rows remain for evaluation, the local maximum attribute value identified by the AMP, that is the attribute value specified by the LMV, is then transmitted to a central node (step 626). The local aggregation routine cycle may then end (step 628).

Figure 7:
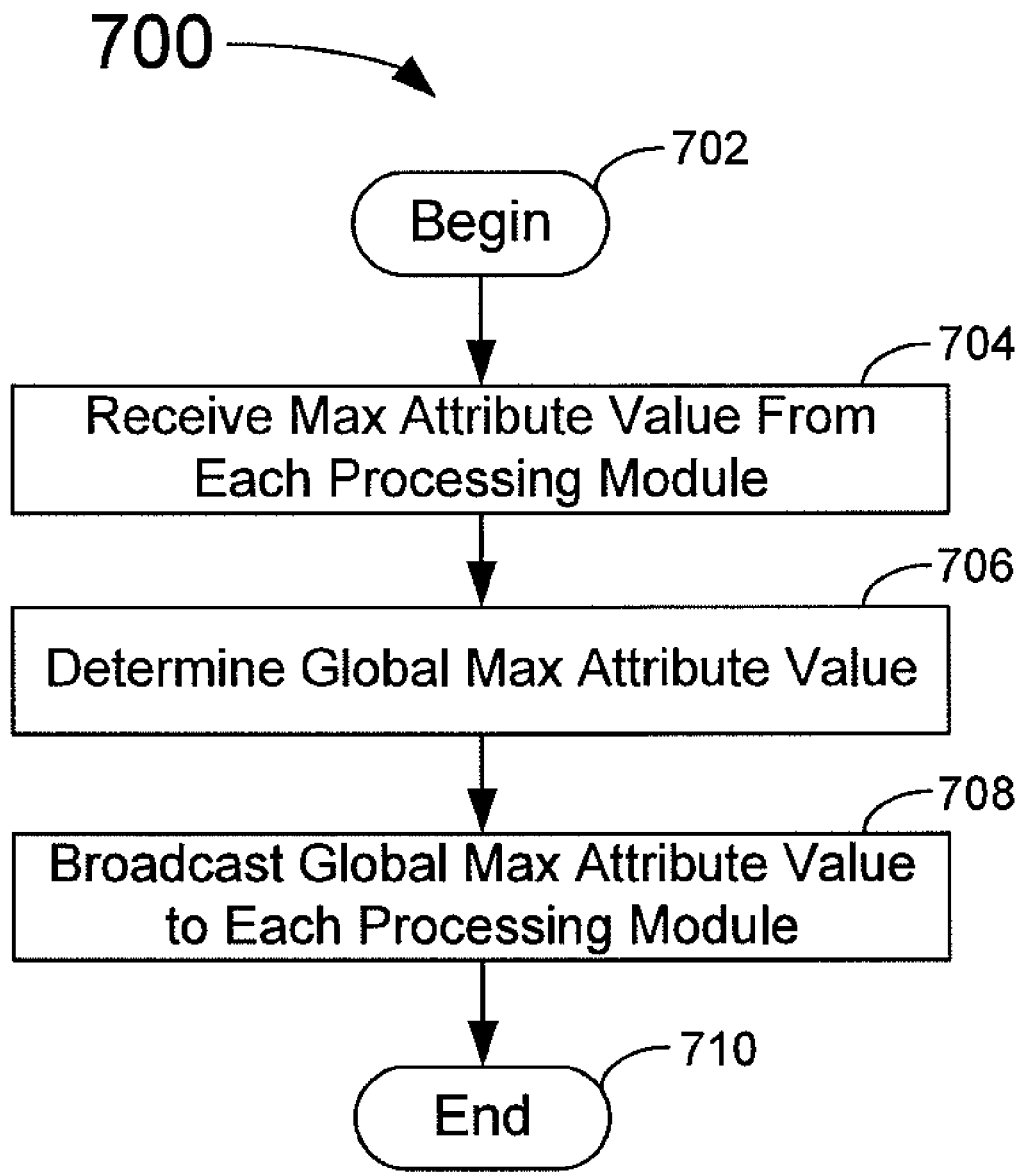
FIG. 7 is a flowchart that depicts processing of a global aggregation routine that facilitates processing optimization of queries that include a maximum or minimum equality condition implemented in accordance with an embodiment.

FIG. 7 is a flowchart 700 that depicts processing of a global aggregation routine that facilitates processing optimization of queries that include a maximum or minimum equality condition implemented in accordance with an embodiment. The processing steps of FIG. 7 may be implemented as computer-executable instructions tangibly embodied on a computer-readable medium executable by a processing system designated as a central node, such as the parsing engine 120 depicted in FIG. 1 or one of the AMPs $210_1$-$210_9$ depicted in FIG. 2.

The global aggregation routine is invoked (step 702), and a central node receives the local maximum values of the attribute on which the maximum equality condition is applied from each of the AMPs involved in processing of the query (step 704). The central node then determines the global maximum value of the attribute on which the maximum equality condition is applied (step 706), that is the central node identifies the largest of the local maximum attribute values reported to the central node from each of the AMPs involved in processing of the query. The global maximum attribute value is then broadcast from the central node to each of the AMPs involved in processing of the query (step 708). The global aggregation routine cycle may then end (step 710).

Figure 8:
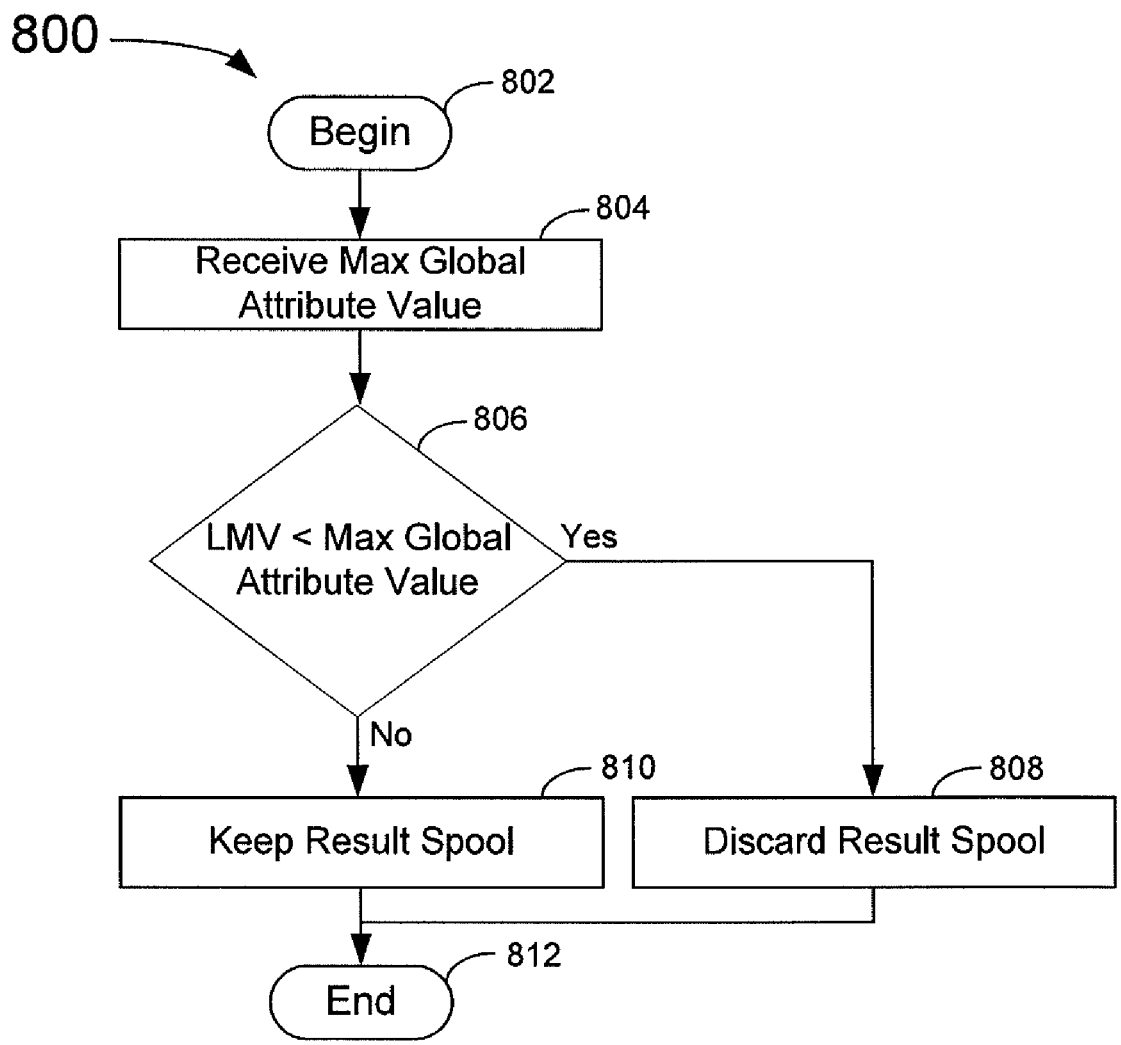
FIG. 8 is a flowchart that depicts processing of a global aggregation subroutine that facilitates processing optimization of queries that include a maximum or minimum equality condition implemented in accordance with an embodiment.

FIG. 8 is a flowchart 800 that depicts processing of a global aggregation subroutine that facilitates processing optimization of queries that include a maximum or minimum equality condition implemented in accordance with an embodiment. The processing steps of FIG. 8 may be implemented as computer-executable instructions tangibly embodied on a computer-readable medium executable by a processing system, e.g., each of the AMPs involved in processing of the query such as the AMPs $210_1$-$210_9$ depicted in FIG. 2.

The global aggregation subroutine is invoked (step 802), and the global maximum attribute value of the attribute on which the maximum equality condition is applied is received by the processing module (step 804). The AMP then compares the global maximum attribute value with the LMV maintained by the AMP that stores the local maximum attribute value that was identified by the AMP (step 806). If the LMV of the AMP is less than the global maximum attribute value thereby indicating that the AMP has not identified any rows that have an attribute value equaling the global maximum attribute value, the AMP discards the row(s) from the AMP's result spool (step 808), and the global aggregation subroutine cycle may then end (step 812). If the LMV of the AMP is determined to not be less than the global maximum attribute value at step 806 thereby indicating the AMP has identified one or more rows that have an attribute value equaling the maximum global attribute value, the AMP then keeps the row(s) stored in the AMP's result spool for the final results of the query (step 810). The global aggregation subroutine cycle may then end according to step 812.

The described local and global aggregation routine can be similarly implemented to accommodate a query with a minimum equality condition. For example, the local aggregation routine described with reference to FIG. 6 accommodate a query with a minimum equality condition by setting the LMV to the largest value that may be stored by the attribute at step 604, determining if the attribute value of rows on which the minimum equality condition is applied is less than the LMV at step 610, determining if the attribute value of the rows on which the minimum equality condition is applied is equal to the LMV at step 618, and transmitting the local minimum attribute value to the central node at step 626. The global aggregation routine of FIG. 7 is modified to identify the global minimum attribute value and broadcast the identified global minimum attribute value to each of the AMPs involved in processing of the query. The global aggregation subroutine of FIG. 8 is modified by determining whether the LMV is greater than the global minimum attribute value at step 806.

In an alternative embodiment, the global aggregation processing routine may be configured without requiring broadcasting from a central node to each processing module involved in processing of the query. In this implementation, each AMP may send its local maximum attribute value of the AMP's result spool, e.g., the AMP's LMV, with a predefined number of result spool rows to the central node. The central node may then compare the maximum attribute value (or alternatively the minimum attribute value) with the attribute values received from other AMPs. The central node may then instruct each AMP either to continue to send out all the rows in its result spool or stop sending any more rows. This implementation provides for a more efficient mechanism for evaluating top N queries as described more fully hereinbelow.

Consider the following exemplary query:
SELECT TOP 1 with ties * FROM Employee ORDER BY salary DESC This query will return an identical result set as the exemplary query with the maximum equality condition discussed hereinabove. However, contemporary RDBMS MPP systems may process the above query in a different manner. For example, this query may result in the table being sorted to identify the top N ("1" in this instance) queries. The above described mechanism may be modified slightly to facilitate processing of a top N query without the "with ties" option which requires the return of only one row even though many rows may contain the highest salary value. For example, consider the following query:
SELECT TOP 1*FROM Employee ORDER BY salary DESC The described mechanisms may accommodate the above query by simply discarding any row having an attribute value that evaluates in the affirmative at step 618 (because only one row is to be returned) thereby reducing local spooling and returning the single row of the result spool to the central node.

In general, the described mechanism may be extended to accommodate a top N query, such as the following:
SELECT TOP N with ties * from Employee ORDER BY SALARY DESC In processing a TOP N query, instead of having a single variable, e.g., LMV, to keep track of the local maximum value on each AMP, a heap sort algorithm having a size N may be utilized to keep track of the top N values that have been identified by the AMP. In the global aggregation, each AMP may send to the central node its top N local values together with the number of rows for each top N value. The central node then determines what rows from each AMP should be returned to be included in the final query result. Alternatively, the modified global aggregation mechanism discussed above may be implemented in which no broadcasting is required. In this implementation, each AMP sends its result spool rows in sorted order to the final merging, or central, node which will merge the results and instruct each AMP whether to stop sending rows or continue with sending more rows.

As described, mechanisms that facilitate optimized processing of queries that feature maximum or minimum equality conditions are provided in which a table on which the query is applied is scanned a single time. Rows of the table distributed to respective processing modules are scanned by the processing modules. Each processing module maintains identification of any rows distributed to the respective processing module that have attribute values that equal the maximum or minimum attribute value locally identified by the processing module. Subsequently, a global aggregation mechanism is invoked to compute the query result without requiring an additional rescan of the table. Further, the disclosed mechanisms may be extended to compute top N queries featuring maximum or minimum equality conditions.

The flowcharts of FIGS. 6-8 depict process serialization to facilitate an understanding of disclosed embodiments and are not necessarily indicative of the serialization of the operations being performed. In various embodiments, the processing steps described in FIGS. 6-8 may be performed in varying order, and one or more depicted steps may be performed in parallel with other steps. Additionally, execution of some processing steps of FIGS. 6-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of optimizing processing of a query specifying a maximum equality condition on an attribute of a table in a parallel processing system, comprising:
   receiving, by a processing module of a plurality of processing modules deployed in the parallel processing system, the query, wherein the processing module has a subset of rows of the table allocated thereto;
   initializing, by the processing module, a variable to maintain a local value of the attribute encountered by the processing module to a value that is less than a value that may be stored by the attribute;
   initializing, by the processing module, a result spool to maintain at least one row of the table having an attribute value that at least equals the variable;
   iteratively evaluating attribute values of the rows allocated to the processing module;
   determining to add a first row to the result spool responsive to determining the attribute value of the first row equals or exceeds the local value of the variable;
   completing evaluation of all rows allocated to the processing module;
   transmitting the local value of the variable to a central node;
   receiving, from the central node, a global maximum attribute value;
   comparing the global maximum value to the local value;
   determining the global maximum attribute value exceeds the local value; and
   deleting all rows from the result spool.

2. The method of claim 1, wherein determining to add the first row comprises determining to add the first row responsive to determining the attribute value of the first row exceeds the local value, the method further comprising:
   deleting any rows of the result spool maintained by the processing module;
   resetting the local value of the variable to the attribute value of the first row; and
   adding the first row to the result spool.

3. The method of claim 1, wherein evaluating attribute values of the rows comprises evaluating an attribute value of a second row, the method further comprising:
   determining the attribute value of the second row equals the local value; and
   adding the second row to the result spool.

4. The method of claim 1, wherein evaluating attribute values of the rows comprises evaluating an attribute value of a second row, the method further comprising:
   determining the attribute value of the second row is less than the local value; and
   deleting the second row by the processing module.

5. The method of claim 1, wherein the query includes a selection of top N rows from the table based on attribute values of the top N rows, the method further comprising:
   storing, in a heap, the top N rows having attribute values that satisfy the selection of the top N rows; and
   transmitting, by the processing module, values of the attributes of the top N rows with the top N rows to a central node.

6. A method of optimizing processing of a query specifying a maximum equality condition on an attribute of a table in a parallel processing system, comprising:
   receiving, by a processing module of a plurality of processing modules deployed in the parallel processing system, the query, wherein the processing module has a subset of rows of the table allocated thereto;
   initializing, by the processing module, a variable to maintain a local value of the attribute encountered by the processing module to a value that is less than a value that may be stored by the attribute;
   initializing, by the processing module, a result spool to maintain at least one row of the table having an attribute value that at least equals the variable;
   iteratively evaluating attribute values of the rows allocated to the processing module;
   determining to add a first row to the result spool responsive to determining the attribute value of the first row equals or exceeds the local value of the variable;
   completing evaluation of all rows allocated to the processing module;
   transmitting the local value of the variable to a central node;
   receiving, from the central node, a global maximum attribute value;
   comparing the global maximum value to the local value;
   determining the global maximum attribute value equals the local value; and
   maintaining rows of the result spool for final results of processing of the query.

7. A method of optimizing processing of a query specifying a minimum equality condition on an attribute of a table in a parallel processing system, comprising:
   receiving, by a processing module of a plurality of processing modules deployed in the parallel processing system, the query, wherein the processing module has a subset of rows of the table allocated thereto;
   initializing, by the processing module, a variable to maintain a local value of the attribute encountered by the processing module to a maximum value that may be stored by the attribute;
   initializing, by the processing module, a result spool to maintain at least one row of the table having an attribute value that is less than or equals the local value;
   iteratively evaluating attribute values of the rows allocated to the processing module;
   determining to add a first row to the result spool responsive to determining the attribute value of the first row is less than or equals the local value;
   completing evaluation of all rows allocated to the processing module;
   transmitting the local value of the variable to a central node;

receiving, from the central node, a global minimum attribute value;
comparing the global minimum value to the local value;
determining the global minimum attribute value is less than the local value; and
deleting all rows from the result spool.

8. The method of claim 7, wherein determining to add the first row comprises determining to add the first row responsive to determining the attribute value of the first row is less than the local value, the method further comprising:
deleting any rows of the result spool maintained by the processing module;
resetting the local value of the variable to the attribute value of the first row; and
adding the first row to the result spool.

9. The method of claim 7, wherein evaluating attribute values of the rows comprise evaluating an attribute value of a second row, the method further comprising:
determining the attribute value of the second row equals the local value; and
adding the second row to the result spool.

10. The method of claim 7, wherein evaluating attribute values of the rows comprises evaluating an attribute value of a second row, the method further comprising:
determining the attribute value of the second row is greater than the local value; and
deleting the second row by the processing module.

11. A method of optimizing processing of a query specifying a minimum equality condition on an attribute of a table in a parallel processing system, comprising:
receiving, by a processing module of a plurality of processing modules deployed in the parallel processing system, the query, wherein the processing module has a subset of rows of the table allocated thereto;
initializing, by the processing module, a variable to maintain a local value of the attribute encountered by the processing module to a maximum value that may be stored by the attribute;
initializing, by the processing module, a result spool to maintain at least one row of the table having an attribute value that is less than or equals the local value;
iteratively evaluating attribute values of the rows allocated to the processing module;
determining to add a first row to the result spool responsive to determining the attribute value of the first row is less than or equals the local value;
completing evaluation of all rows allocated to the processing module;
transmitting the local value of the variable to a central node;
receiving, from the central node, a global minimum attribute value;
comparing the global minimum value to the local value;
determining the global minimum attribute value equals the local value; and
maintaining rows of the result spool for final results of processing of the query.

12. A non-transitory computer-readable medium having computer-executable instructions for execution by a processing system, the computer-executable instructions for optimizing processing of a query specifying a maximum equality condition on an attribute of a table in a parallel processing system, the computer-executable instructions, when executed, cause the processing system to:
receive, by a processing module of a plurality of processing modules deployed in the parallel processing system, the query, wherein the processing module has a subset of rows of the table allocated thereto;
initialize, by the processing module, a variable to maintain a local value of the attribute encountered by the processing module, wherein the variable is initialized to a value that is less than a minimum value that may be stored by the attribute;
initialize, by the processing module, a result spool to maintain at least one row of the table having an attribute value that at least equals the variable;
iteratively evaluate attribute values of the rows allocated to the processing module;
determine to add a first row to the result spool responsive to determining the attribute value of the first row equals or exceeds a value of the variable;
complete evaluation of all rows allocated to the processing module;
transmit the local value of the variable to a central node;
receive, from the central node, a global maximum attribute value;
compare the global maximum value to the local value;
determine the global maximum attribute value exceeds the local value; and
delete all rows from the result spool.

13. The non-transitory computer-readable medium of claim 12, wherein the instructions that evaluate attribute values of the rows comprise instructions that evaluate an attribute value of a second row, the computer-readable medium further comprising instructions that, when executed, cause the processing system to:
determine the attribute value of the second row equals the local value; and
add the second row to the result spool.

14. The non-transitory computer-readable medium of claim 12, wherein the instructions that evaluate attribute values of the rows comprise instructions that evaluate an attribute value of a second row, the computer-readable medium further comprising instructions that, when executed, cause the processing system to:
determine the attribute value of the second row is less than the local value; and
delete the second row by the processing module.

15. The non-transitory computer-readable medium of claim 12, wherein the query includes a selection of top N rows from the table based on attribute values of the top N rows, the computer-readable medium further comprising instructions that, when executed, cause the processing system to:
store, in a heap, the top N rows having attribute values that satisfy the selection of the top N rows; and
transmit, by the processing module, values of the attributes of the top N rows with the top N rows to a central node.

16. The non-transitory computer-readable medium of claim 12, wherein the instructions that determine to add the first row comprise instructions that determine to add the first row responsive to determining the attribute value of the first row exceeds the local value, the computer-readable medium further comprising instructions that, when executed, cause the processing system to:
delete any rows of the result spool maintained by the processing module;
reset the local value of the variable to the attribute value of the first row; and
add the first row to the result spool.

17. A non-transitory computer-readable medium having computer-executable instructions for execution by a processing system, the computer-executable instructions for optimizing processing of a query specifying a maximum equality condition on an attribute of a table in a parallel processing system, the computer-executable instructions, when executed, cause the processing system to:
> receive, by a processing module of a plurality of processing modules deployed in the parallel processing system, the query, wherein the processing module has a subset of rows of the table allocated thereto;
> initialize, by the processing module, a variable to maintain a local value of the attribute encountered by the processing module, wherein the variable is initialized to a value that is less than a minimum value that may be stored by the attribute;
> initialize, by the processing module, a result spool to maintain at least one row of the table having an attribute value that at least equals the variable;
> iteratively evaluate attribute values of the rows allocated to the processing module;
> determine to add a first row to the result spool responsive to determining the attribute value of the first row equals or exceeds a value of the variable;
> complete evaluation of all rows allocated to the processing module;
> transmit the local value of the variable to a central node;
> receive, from the central node, a global maximum attribute value;
> compare the global maximum value to the local value;
> determine the global maximum attribute value equals the local value; and
> maintain rows of the result spool for final results of processing of the query.

18. A non-transitory computer-readable medium having computer-executable instructions for execution by a processing system, the computer-executable instructions for optimizing processing of a query specifying a minimum equality condition on an attribute of a table in a parallel processing system, the computer-executable instructions, when executed, cause the processing system to:
> receive, by a processing module of a plurality of processing modules deployed in the parallel processing system, the query, wherein the processing module has a subset of rows of the table allocated thereto;
> initialize, by the processing module, a variable to maintain a local value of the attribute encountered by the processing module, wherein the variable is initialized to a maximum value that may be stored by the attribute;
> initialize, by the processing module, a result spool to maintain at least one row of the table having an attribute value that is less than or equals the local value;
> iteratively evaluate attribute values of the rows allocated to the processing module;
> determine to add a first row to the result spool responsive to determining the attribute value of the first row is less than or equals the local value;
> complete evaluation of all rows allocated to the processing module;
> transmit the local value of the variable to a central node;
> receive, from the central node, a global minimum attribute value;
> compare the global minimum value to the local value;
> determine the global minimum attribute value is less than the local value; and
> delete all rows from the result spool.

19. The non-transitory computer-readable medium of claim 18, wherein the instructions that determine to add the first row determine to add the first row responsive to determining the attribute value of the first row is less than the local value, the computer-readable medium further comprising instructions that, when executed, cause the processing system to:
> delete any rows of the result spool maintained by the processing module;
> reset the local value of the variable to the attribute value of the first row; and
> add the first row to the result spool.

20. The non-transitory computer-readable medium of claim 18, wherein the instructions that evaluate attribute values of the rows evaluate an attribute value of a second row, the computer-readable medium further comprising instructions that, when executed, cause the processing system to:
> determine the attribute value of the second row equals the local value; and
> add the second row to the result spool.

21. The non-transitory computer-readable medium of claim 18, wherein the instructions that evaluate attribute values of the rows evaluate an attribute value of a second row, the computer-readable medium further comprising instructions that, when executed, cause the processing system to:
> determine the attribute value of the second row is greater than the local value; and
> delete the second row by the processing module.

22. A non-transitory computer-readable medium having computer-executable instructions for execution by a processing system, the computer-executable instructions for optimizing processing of a query specifying a minimum equality condition on an attribute of a table in a parallel processing system, the computer-executable instructions, when executed, cause the processing system to:
> receive, by a processing module of a plurality of processing modules deployed in the parallel processing system, the query, wherein the processing module has a subset of rows of the table allocated thereto;
> initialize, by the processing module, a variable to maintain a local value of the attribute encountered by the processing module, wherein the variable is initialized to a maximum value that may be stored by the attribute;
> initialize, by the processing module, a result spool to maintain at least one row of the table having an attribute value that is less than or equals the local value;
> iteratively evaluate attribute values of the rows allocated to the processing module;
> determine to add a first row to the result spool responsive to determining the attribute value of the first row is less than or equals the local value;
> complete evaluation of all rows allocated to the processing module;
> transmit the local value of the variable to a central node;
> receive, from the central node, a global minimum attribute value;
> compare the global minimum value to the local value;
> determine the global minimum attribute value equals the local value; and
> maintain rows of the result spool for final results of processing of the query.

* * * * *